United States Patent
Hardin et al.

(10) Patent No.: US 10,496,627 B2
(45) Date of Patent: Dec. 3, 2019

(54) CONSISTENT RING NAMESPACES FACILITATING DATA STORAGE AND ORGANIZATION IN NETWORK INFRASTRUCTURES

(71) Applicant: EXABLOX CORPORATION, Sunnyvale, CA (US)

(72) Inventors: Charles Hardin, Campbell, CA (US); Sridhar Subramaniam, Sunnyvale, CA (US); Tad Hunt, Sunnyvale, CA (US); Frank E. Barrus, New Ipswich, NH (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 206 days.

(21) Appl. No.: 15/488,303

(22) Filed: Apr. 14, 2017

(65) Prior Publication Data
US 2017/0220614 A1 Aug. 3, 2017

Related U.S. Application Data

(63) Continuation of application No. 13/441,592, filed on Apr. 6, 2012, now Pat. No. 9,628,438.

(51) Int. Cl.
| | |
|---|---|
| *G06F 15/16* | (2006.01) |
| *G06F 12/02* | (2006.01) |
| *G06F 16/22* | (2019.01) |
| *H04L 29/12* | (2006.01) |
| *H04L 29/08* | (2006.01) |

(52) U.S. Cl.
CPC ...... *G06F 16/2282* (2019.01); *G06F 16/2255* (2019.01); *H04L 61/1582* (2013.01); *H04L 67/1097* (2013.01)

(58) Field of Classification Search
CPC ............ H04L 61/1582; H04L 67/1097; G06F 17/30339; G06F 17/3033
See application file for complete search history.

(56) References Cited

U.S. PATENT DOCUMENTS

| | | | |
|---|---|---|---|
| 8,788,628 B1* | 7/2014 | Taylor | G06F 17/30132 709/219 |
| 2005/0091670 A1* | 4/2005 | Karatal | G06F 9/451 719/328 |
| 2006/0010227 A1* | 1/2006 | Atluri | G06F 11/1453 709/217 |

(Continued)

*Primary Examiner* — Kevin T Bates
*Assistant Examiner* — Mark A Scott
(74) *Attorney, Agent, or Firm* — Maschoff Brennan

(57) ABSTRACT

Computer-implemented methods and systems for managing data objects within a computer network infrastructure that facilitate more efficient and reliable data storage and access are provided. An exemplary method may comprise establishing a physical identifier for each storage resource. A plurality of unique virtual identifiers for each storage resource is generated based on the physical identifier. The plurality of unique virtual identifiers is stored in a consistent ring namespace accessible to every node. An object identifier associated with a location of a data object to be stored in a storage resource is generated. The object identifier is mapped to the consistent ring namespace. The method may also include enabling traversing the consistent ring namespace from any node in the computer network to locate and access the data object.

20 Claims, 12 Drawing Sheets

(56) References Cited

U.S. PATENT DOCUMENTS

| | | | |
|---|---|---|---|
| 2006/0039371 A1* | 2/2006 | Castro | H04L 12/42 370/389 |
| 2007/0156842 A1* | 7/2007 | Vermeulen | H04L 67/42 709/217 |
| 2009/0327312 A1* | 12/2009 | Kakivaya | H04L 29/12132 |
| 2010/0003100 A1* | 1/2010 | Ernst | F16B 13/002 411/30 |
| 2010/0146013 A1* | 6/2010 | Mather | G06F 16/10 707/803 |
| 2011/0231524 A1* | 9/2011 | Lin | G06F 17/30197 709/220 |
| 2012/0036178 A1* | 2/2012 | Gavini | G06F 9/5027 709/203 |
| 2012/0078915 A1* | 3/2012 | Darcy | G06F 16/137 707/747 |
| 2012/0233522 A1* | 9/2012 | Barton | H04L 67/06 714/758 |
| 2012/0290629 A1* | 11/2012 | Beaverson | H04L 67/1087 707/827 |
| 2012/0331462 A1* | 12/2012 | Falko | G06F 9/45533 718/1 |
| 2013/0013571 A1* | 1/2013 | Sorenson, III | G06F 3/0605 707/687 |
| 2013/0179481 A1* | 7/2013 | Halevy | G06F 17/30094 707/827 |
| 2013/0268740 A1* | 10/2013 | Holt | G06F 21/00 711/163 |
| 2013/0275381 A1* | 10/2013 | De Schrijvr | G06F 11/1076 707/652 |

\* cited by examiner

CONSISTENT RING NAMESPACES FACILITATING DATA STORAGE AND ORGANIZATION IN NETWORK INFRASTRUCTURES

CROSS-REFERENCE TO A RELATED APPLICATION

This application is a continuation of U.S. patent application Ser. No. 13/441,592, filed Apr. 6, 2012, now U.S. Pat. No. 9,628,438, which is incorporated herein by reference in its entirety.

TECHNICAL FIELD

This disclosure relates generally to organizing resources and more specifically to storage and organization of data in computing network infrastructures utilizing consistent ring namespaces.

DESCRIPTION OF RELATED ART

The approaches described in this section could be pursued but are not necessarily approaches that have been previously conceived or pursued. Therefore, unless otherwise indicated, it should not be assumed that any of the approaches described in this section qualify as prior art merely by virtue of their inclusion in this section.

In computing systems, data is stored and retrieved in a variety of manners. Some of the past approaches have been hierarchical namespaces used in file systems and relational tables used in databases.

Another approach can be a "flat" namespace for an object store interface where every object is given a unique identifier and that identifier is used to retrieve the data associated with this object. This type of interface is common in distributed computing systems where several clients only need to compute the object identifier to retrieve the data.

Object based storage systems can define the attributes of the objects and organize the objects in the most space efficient manner of storage and retrieval. These objects will then be distributed among multiple nodes in the computer network. Existing approaches do not provide an easy and fast way to traverse data object locations via namespaces of networked nodes. Typically, accessing data objects requires two actions, which include a lookup of a node (e.g., a hard drive) and a lookup of a data object stored on a particular node. Such an approach is time consuming and ineffective, especially when a computing network involves a great number of nodes.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to various embodiments and principles described herein, the problems of prior art are addressed by methods and systems for managing data objects within a computer network infrastructure that facilitate more efficient and reliable data storage and access.

In accordance with one aspect, a method for managing data objects within a computer network infrastructure comprising a plurality of nodes is provided. Each node of the network may comprise one or more storage resources. The method may comprise establishing a physical identifier for each storage resource. A plurality of unique virtual identifiers for each storage resource is generated based on the physical identifier. The plurality of unique virtual identifiers is stored in a consistent ring namespace accessible for every node. An object identifier associated with a location of a data object to be stored in a storage resource is also generated. The object identifier is mapped to the consistent ring namespace. The method may also comprise enabling traversing the consistent ring namespace from any node in the computer network to locate and access the data object.

According to various embodiments, the generation of the plurality of unique virtual identifiers may comprise applying consistent hashing to the physical identifier associated with the storage resource. The physical identifier can be a hash function of at least a storage resource identifier. The data object identifier can be a hash function of data and data length. The number of generated unique virtual identifiers is the same or greater than the number of storage resources in the computer network infrastructure. The number of generated unique virtual identifiers related to a single node can also be associated with a relative size of the storage resources of the node. The consistent ring namespace can be associated with one or more data object replicas and the associated unique virtual identifiers of the storage resources.

The method may further include generating a plurality of data object replicas and storing them in different storage resources on different nodes in the computer network infrastructure. The number of data object replicas may correspond to a replication factor, the replication factor may be adapted based on the number of storage resources or policy requirements of the computer network infrastructure. The enabling traversing of the consistent ring namespace may comprise navigating, through a consistent ring namespace, to storage resource identifiers in order to determine a location of the data object. The plurality of unique virtual identifiers can be generated in such a way that an arbitrary number of unique virtual identifiers is distributed over the consistent ring namespace. The method may further comprise re-distributing unique virtual identifiers within the consistent ring namespace when a node is added or removed from the computer network infrastructure, or when available capacity of any storage resource is changed. The method may also include re-distributing data objects to different nodes after the ring namespace has been changed in view of addition or removal of at least one node or at least one storage resource.

According to another aspect, a system for managing data objects within a computer network infrastructure comprising a plurality of nodes is provided. The system may comprise a physical identifier module configured to establish a physical identifier for each storage resource and a virtual identifier module configured to generate, based on the physical identifier, a plurality of unique virtual identifiers for each storage resource, with the plurality of unique virtual identifiers stored in a consistent ring namespace accessible to every node. The system may also comprise an object identifier module configured to generate an object identifier associated with a location of a data object to be stored in a storage resource. The system may comprise a mapping module configured to map the object identifier to the consistent ring namespace. The system may also comprise a traversing module configured to enable traversing the consistent ring namespace from any node in the computer network to locate and access the data object.

According to various embodiments, the system may additionally comprise a replica generator configured to generate a plurality of data object replicas and store them in different storage resources. Furthermore, the system may include a re-distributing module configured to re-distribute the unique virtual identifiers within the consistent ring namespace when a node is added or removed from the computer network infrastructure, or when available capacity of storage resource is changed within a certain node.

According to yet another aspect, a processor-readable medium having instructions stored thereon is provided. The instructions, when executed by one or more processors, may cause the one or more processors to: establish a physical identifier for each storage resource, generate, based on the physical identifier, a plurality of unique virtual identifiers for each storage resource, with the plurality of unique virtual identifiers stored in a consistent ring namespace accessible to every node; generate an object identifier associated with a location of a data object to be stored in a storage resource; map the object identifier to the consistent ring namespace, and enable traversing the consistent ring namespace from any node in the computer network to locate and access the data object.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
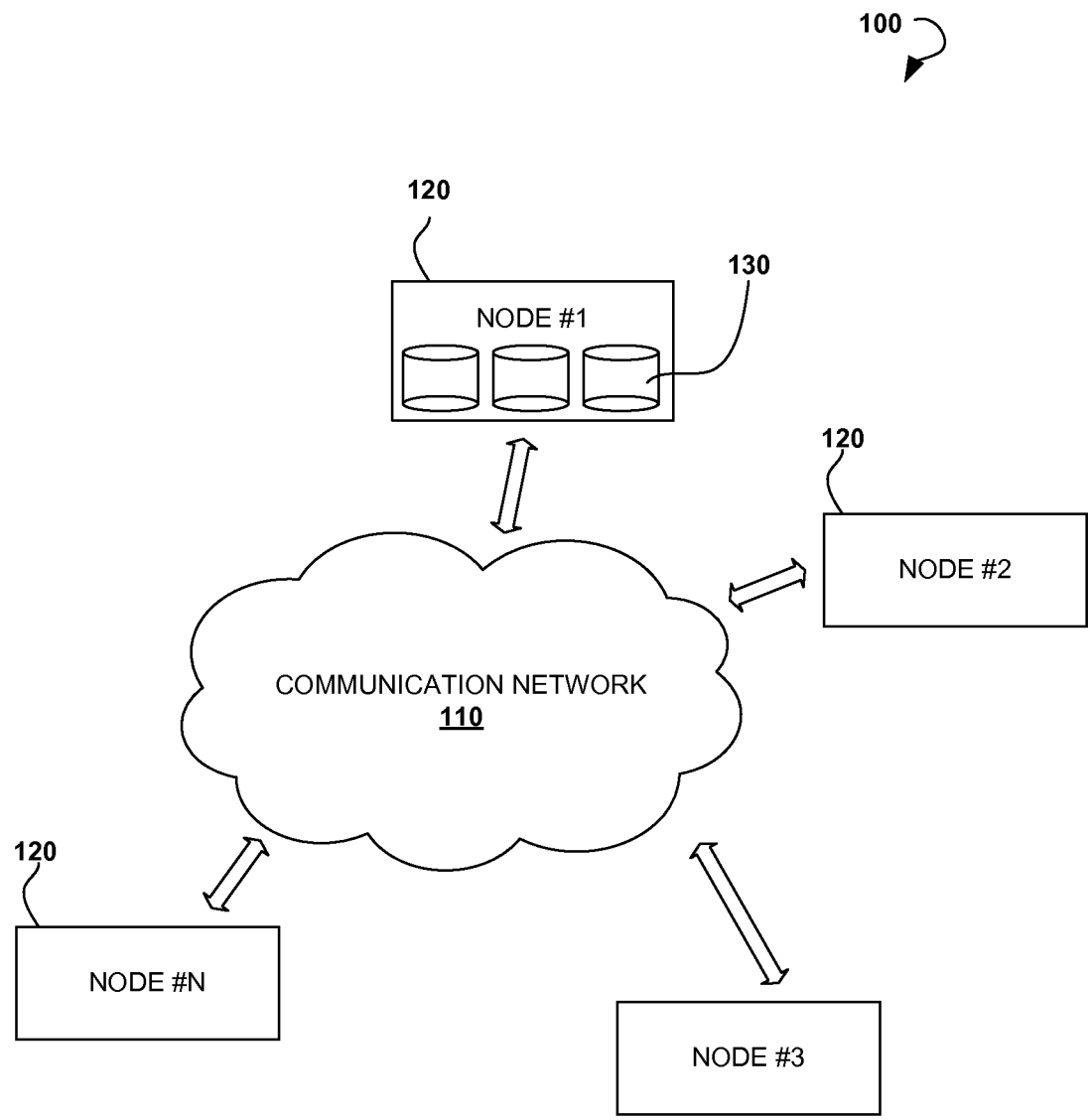
FIG. 1 shows a simplified structure of a computer network infrastructure.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

The approaches and principles disclosed herein relate to computer-implemented methods and systems for managing data objects within a computer network infrastructure. The computer network infrastructure includes a plurality of nodes each having storage resources for storing various data objects and enabling access to them from other nodes. Moreover, the storage resources of a single node may include one or a plurality of hard drives, solid state drives, or other memory devices such as RAM (random-access memory), Flash, or ROM (read-only memory). Each data object can be provided with a unique identifier that can be stored in a namespace of a particular node to enable traversing a path to that object.

The present disclosure provides for a consistent ring namespace on top of all nodes which allows for each node to use the consistent ring namespace to locate the storage resource of desired data objects in the computer network infrastructure. The consistent ring namespace is a single and common namespace in a cluster and it serves to designate locations of data objects for every node that is a member of this cluster. According to various embodiments described herein, the consistent ring namespace may be separated by virtual identifiers to designate various nodes and their corresponding storage resources such that a plurality of data object identifiers stored in the namespace may identify both a data object and its location. Accordingly, there is only a single act needed to locate a data object (i.e., to lookup the data object identifier via the consistent ring namespace). It allows for any node to gracefully locate a desired data object stored at another node or nodes. In other words, the consistent ring namespace is provided and is accessible to every node within the network, and each node may look up and access data objects located at other nodes. Thus, there is no necessity to query a single node for the location of the data and provides a distributed lookup algorithm for the cluster.

Object identifiers are generated based on principles of "consistent hashing." In general, consistent hashing is a special kind of hashing wherein a change in the number of array slots causes only K/n keys to be remapped, wherein K is the number of keys, and n is the number of slots. This makes consistent hashing ideal in circumstances where the set of parameters, such as a number or volume of memory resources, changes over time. In turn, it eliminates the need to maintain a centralized state of identifiers for all nodes in the network and, thus, data access speeds can be increased.

The consistent hashing results may be mapped onto a ring to facilitate the search algorithms that find data objects, nodes, and storage resources in the computer network infrastructure. For example, a "clockwise" or "counter-clockwise" search will find all the storage resources in a predictable order using the consistent ring namespace. This allows every node to use the same "ringwalk" algorithm and locate identifiers in the same order on the consistent ring namespace. However, it should be understood that any type of namespace can be used.

The following provides the detailed description of various embodiments related to managing data objects within a computer network infrastructure comprising a plurality of nodes.

Referring now to the drawings, FIG. 1 shows a simplified structure of a computer network infrastructure 100 according to various embodiments. The computer network infrastructure 100 includes a network 110 interconnecting a plurality of nodes 120. Each node 120, in turn, may include multiple storage resources 130 to store data objects. Physical namespaces can be used to organize resources within each node 120. Each node 120 can be any suitable networking element that maintains a network address and can store and share data objects with other nodes 120. In an example, the node 120 may refer to a computer, a server, a laptop, a tablet computer, a portable computing device, a PDA, a handheld cellular phone, a mobile phone, a smart phone, a thin client, or any other electronic computing device suitable for communicating data via the network 110. Furthermore, each node 120 may include multiple storage resources 130 such as a hard disk drive, SSD, RAM, ROM, flash memory, and the like.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port, such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network.

Figure 2:
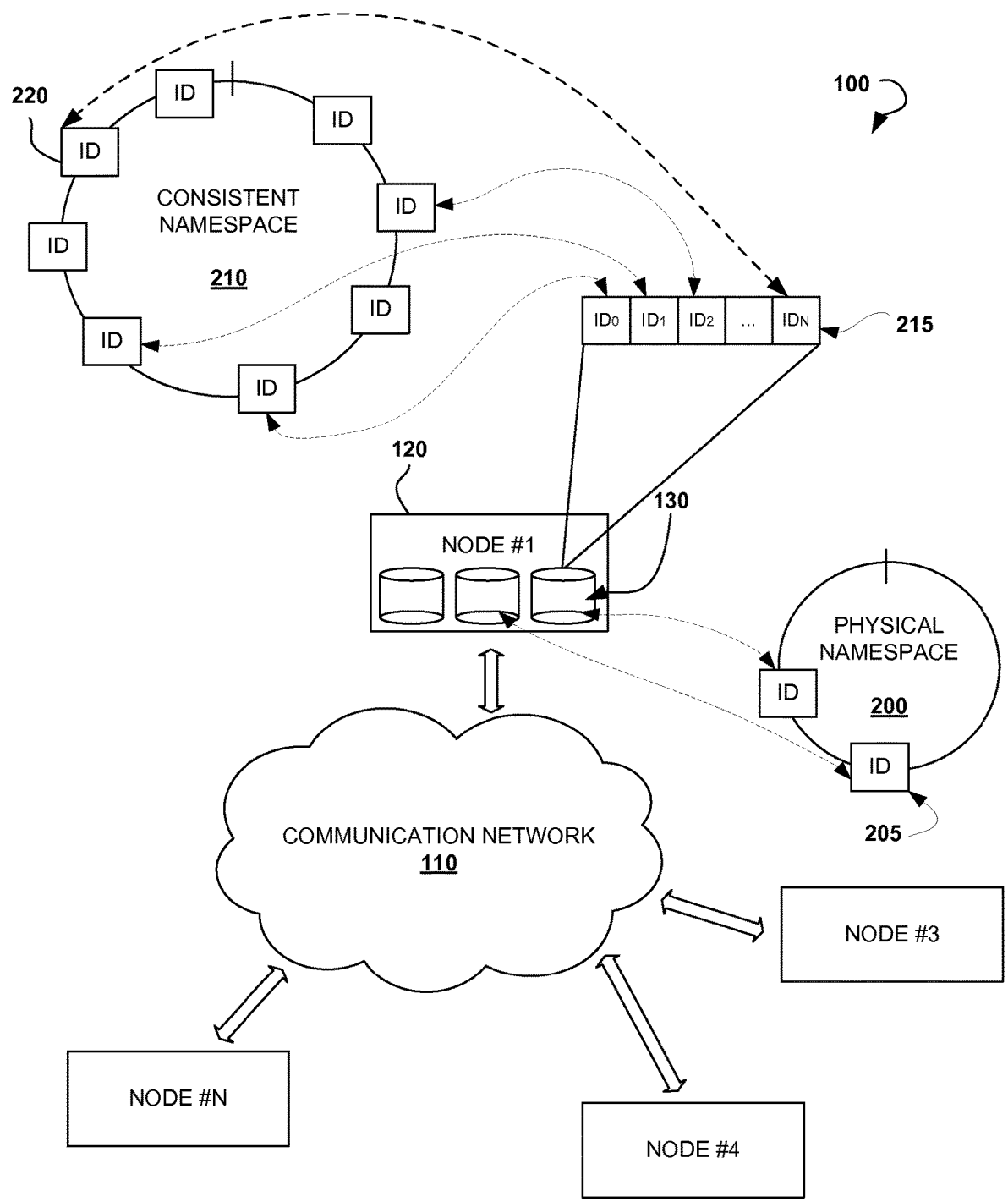
FIG. 2 shows a simplified structure of a computer network infrastructure.

FIG. 2 shows a simplified structure of computer network infrastructure 100 according to various embodiments. As shown in the figure, each node 120 having multiple storage resources 130 can be associated with physical namespaces 200. The physical namespaces 200 are used to organize storage resources within each node 120. Physical namespaces 200 can be organized as a ring whereas each element may represent a storage identifier 205 to designate a location of a corresponding storage resource.

Object identifiers will be computed by hash functions such that the consistent namespace 210 provides hash key-value pairs for every stored data object. In an example, object identifiers may be represented as follows:

Object.ID:=HASH(object.data, object.length)

In various embodiments, any cryptographic hashing algorithm can be used as a hash function. For example, MD5 or SHA-1 cryptographic algorithms can be used as they provide a suitable distribution for consistent hashing which is discussed below.

With continuing reference to FIG. 2, a consistent namespace 210 can be utilized to manage all storage resources 130 of all nodes 120, and it can be responsible for data object location, addressing, accessing, performing actions under data objects, and so forth.

The consistent namespace 210 can be implemented as a ring namespace. Elements of the consistent namespace 210 are virtual identifiers 220. A series of virtual identifiers 215 is derived from a single storage resource 130. Each virtual identifier 220 out of the series of virtual identifiers 215 is mapped to the consistent namespace 210 based on the hash value of the virtual identifier as described below. Accordingly, the consistent namespace 210 can be accessed by at least one node 120, and thus such node 120 can determine the object identifier and perform various mapping functions to determine data object replicas or any other algorithmic lookup operations as required. It is important to note that these algorithms are for traversing the consistent namespace 210 and are independent of the actual object storage within any node 120.

As mentioned, virtual identifiers 220 on the consistent namespace 210 can be generated with the help of a hashing algorithm applied to the physical identifiers of the storage resources 130. This process can be represented as follows.

Locations of storage resources 130 are mapped to the consistent namespace 210 by generating a key from the unique identifier of the storage resource 130 with the following algorithm:

Physical.ID:=HASH(disk.uuid, disk.uuidlength)

where disk.uuid and disk.uuidlength describe a universally unique identifier of a storage resource.

Since this is a cryptographic hashing function, the location on the consistent ring namespace cannot be predicted and consequently the identifiers can be relatively close together on the consistent ring namespace. To account for this uncertainty, a chain of "virtual" identifiers can be generated and can establish ownership of certain spaces on the ring namespace. The virtual identifiers may be represented by the following hash functions:

Virtual.$ID_0$:=HASH(Physical.ID, HASH.length)

Virtual.$ID_1$:=HASH(Virtual.$ID_0$, HASH.length)

Virtual.$ID_2$:=HASH(Virtual.$ID_1$, HASH.length)

. . .

Virtual.$ID_n$:=HASH(Virtual.$ID_{n-1}$, HASH.length)

Accordingly, the virtual identifiers are generated as a chain of hash functions being all based on the physical identifier. It should be understood that statistically, more identifiers being generated should "smooth" the consistent ring namespace ownership to a proportionate amount per storage resource.

Figure 3:
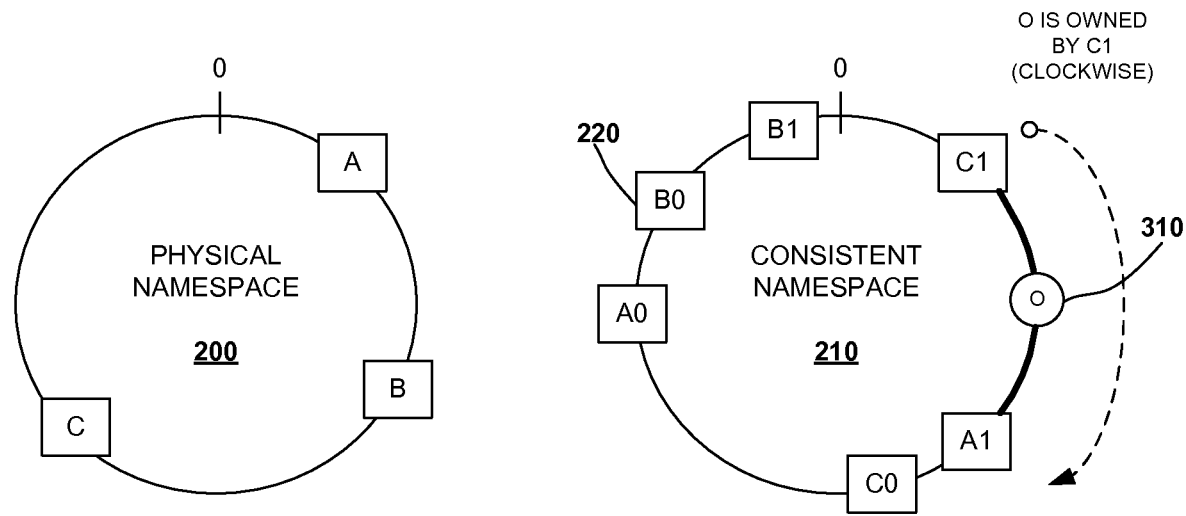
FIG. 3 shows a graphical representation of a physical ring namespace and a consistent ring namespace.

FIG. 3 shows a graphical representation of the physical namespace 200 and the consistent namespace 210, according to an exemplary embodiment. As shown on this figure, virtual identifiers 220 may be distributed randomly over the consistent namespace 210 to create consistent distribution of identifiers. Unique virtual identifiers are generated so that their number is the same or greater than the number of storage resources in the network 110. The number of generated unique virtual identifiers, related to a single node 120, can also be associated with relative size of the storage resources 130 of this node 120.

In accordance with various embodiments, using multiple virtual identifiers Virtual.ID$_i$ allows searching for a data object 310 in the consistent namespace 210 using a clockwise (or counter-clockwise) comparison of the physical identifier with the virtual identifiers 220, as shown on FIG. 3. Once the data object 310 location can be determined, the data object replica locations can be searched and mapped according to established virtual identifiers 220.

Figure 4:
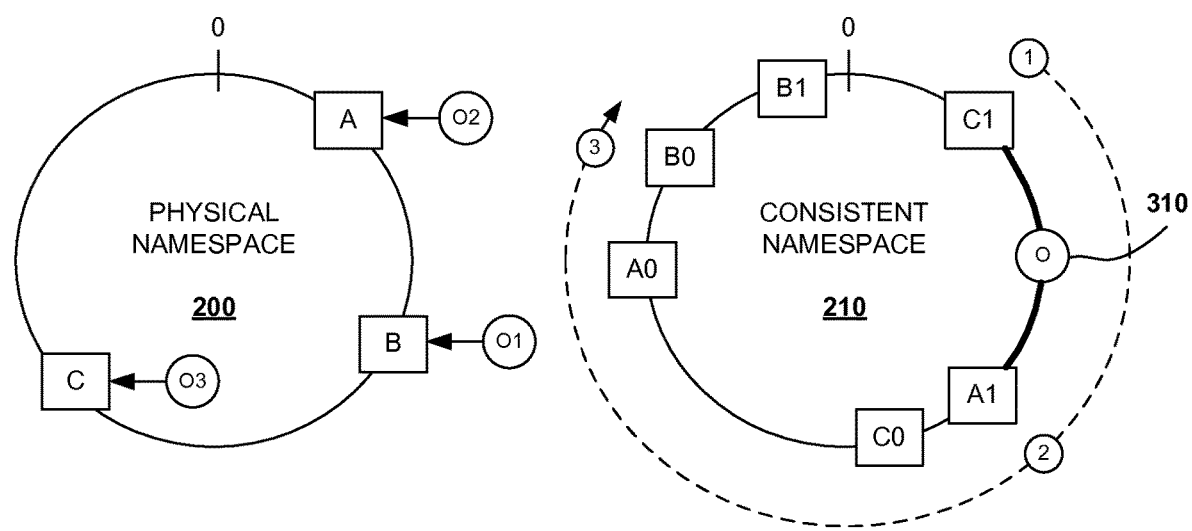
FIG. 4 shows a graphical representation of the physical and consistent ring namespaces and locations for storing data object replicas.

In general, there are two options to search data object replica locations. The first option is to perform "ringwalk" through consistent ring namespace and locate the next location by mapping the virtual data identifiers to physical data identifiers. The resulting data object replica locations are shown in FIG. 4 in a simplified and exemplary way, whereas $O_1$, $O_2$, and $O_3$ denote data object replica locations. Determining location of the data object replica can be expressed in a pseudocode, for example, as follows:

```
procedure primaryvdisk(vring, objid)
begin
    for(vdisk = vring.head; vdisk != nil; vdisk = vdisk.next) {
        if(vdisk.vid > objid) {
            if(vdisk.prev == nil)
                return vring.tail
            return vdisk.prev
        }
    }
    return vring.tail
end
procedure nextvdisk(vring, startvdisk)
begin
    vdisk = startvdisk.next;
    if(vdisk != nil)
        return vdisk
    return vring.head
end
procedure remove_all_phys(vring, vdisk)
begin
    for(d = vring.head; d != nil; d = next) {
        next = d.next
        if(d == vdisk)
            continue
        if(d.physid != vdisk.physid)
            continue
        vring.remove(d)
    }
    next = nextvdisk(vring, vdisk)
    if (next == vdisk)
        next = nil
    vring.remove(vdisk)
    return (vring, next)
end
procedure nodeid_reverse_inlist(list, n, nodeid)
begin
    for(cur = list.tail; cur != nil; cur = cur.prev) {
        if(cur.nodeid == nodeid)
            return true
        --n
        if(n == 0)
```

```
            break
    }
    return false
end
procedure ringwalk(vring, objid, nreplica, callback, cbargs)
begin
    replicas = { }
    nlookback = nreplica
    if(nreplica < 0 or vring.num_nodes <= nreplica)
        /* lookback thru all nodes in the ring */
        nlookback = vring.num_nodes-1
    d = primaryvdisk(vring, objid)
    while(not vring.empty) {
        replicas.append(d)
        op = callback(d, objid, cbargs)
        if(op == STOP)
            break
        (vring, start) = remove_all_phys(vring, d)
        if (start == nil)
            break
        d = start
        while(nodeid_reverse_inlist(replicas, nlookback, d.nodeid)) {
            d = nextvdisk(vring, d)
            if(d == start)
                break
        }
    }
    return replicas
end
procedure mkreplicas(vring, objid, nreplica, cbargs)
begin
    replicas = ringwalk(objid, vring, nreplica, noop, nil)
    return replicas
end
procedure nextvdisk_byrehash(vring, id)
begin
    nextid = HASH(id)
    return primaryvdisk(vring, nextid)
end
```

Another option for searching data object replica locations is on the physical namespace ring. This is accomplished by mapping the virtual identifier 220 to a storage identifier 205 on the physical namespace. The replica locations are then determined by walking the physical name in a clockwise manner to determine the next storage resource for the replica.

In general, the algorithms as described above allow any node 120 to compute locations of any data object and the associated replicas that an object should be stored on. The actual write operation of any data object should depend on the available capacity of the storage resource 130, operational state of a node 120, and any other attributes that need to be considered outside of the namespace calculation.

Following is a discussion of the typical operations performed over namespaces, including the writing and reading of a data object and rebalancing algorithms.

Writing Algorithm

The goal of the writing algorithm is to, first, distribute data object replicas to storage resources of different nodes, and, second, gracefully fallback to preserve the data object replicas if at all possible. It guarantees that a data object is written to different storage resources so that a failure of a single storage resource does not lose the only copy of the data object. As long as the number of nodes is at least the same or more as the number of data object replicas, the writing algorithm also guarantees that (number of replicas–1) nodes can fail.

A data object write into a storage resource 130 uses the data object replica set determined by the data object location on the consistent namespace 210. In the case where the number of replicas is greater than the number of nodes 120 in the network infrastructure 100, the writing algorithm stores the data object to the same nodes that were previously used to achieve the replication factor. The replication may degrade to efficiently pick separate storage resources 130 within these reused nodes 120.

Figure 5:
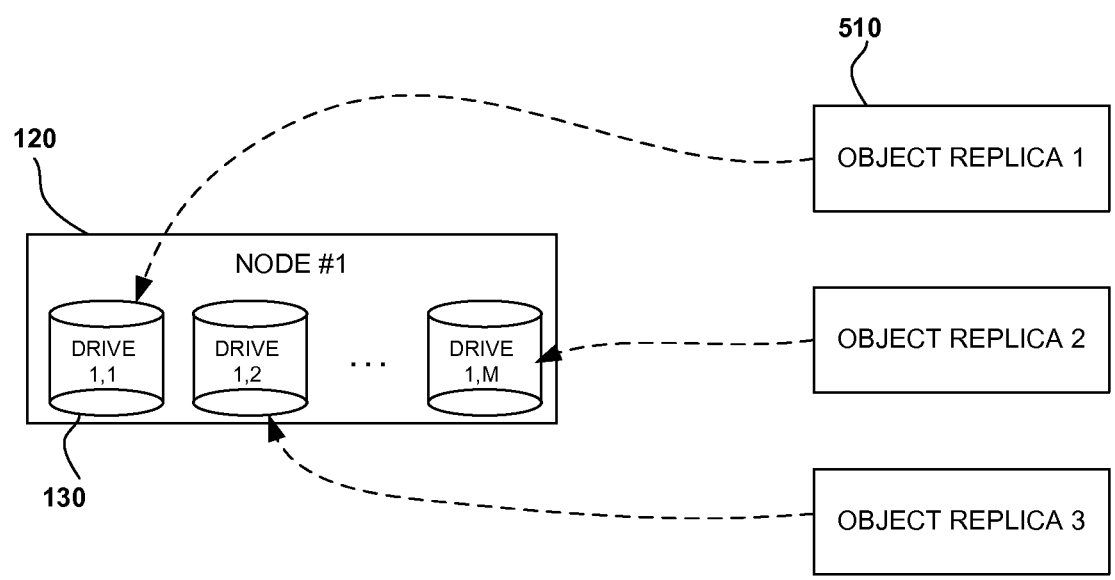
FIG. 5 shows a simplified process of storing data object replicas in different storage resources within a single node.
Figure 6:
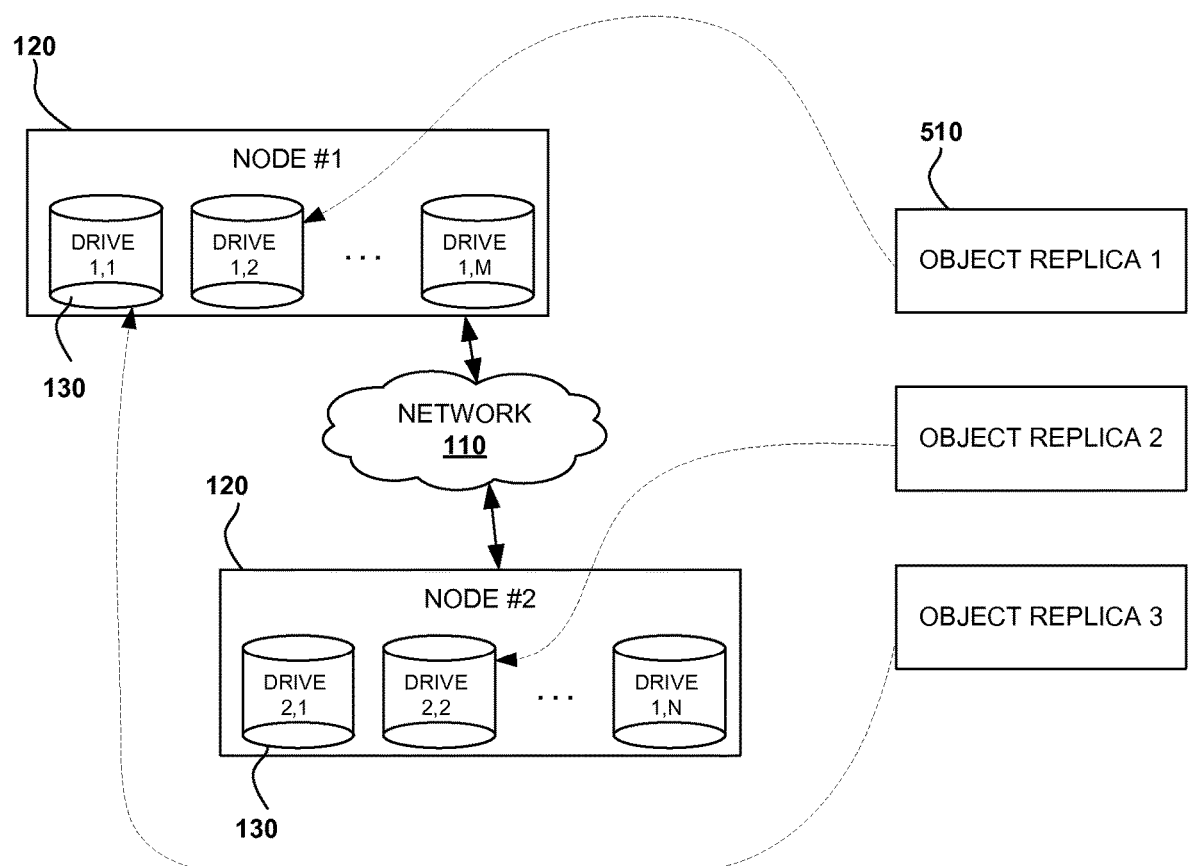
FIG. 6 shows a simplified process of storing data object replicas in different storage resources of multiple different nodes.

FIG. 5 shows a simplified way of how data object replicas 510 are stored in different storage resources 130 within a single node 120, according to an exemplary embodiment. However, in some other embodiments, it may be more reliable to store data object replicas in different storage resources of two or more nodes. This approach may help achieve a higher fault tolerance. FIG. 6 shows this approach. In particular, depicted is a simplified exemplary process of storing three data object replicas 510 in different storage resources 130 of two nodes 120.

Another attribute of the writing algorithm is to handle situations when the capacity of a particular storage resource 130 changes so that it cannot handle any more data objects being committed to persistent storage. Consequently, the writing algorithm proceeds down the "chain" of the resource storages until the desired replication factor is satisfied. The replication factor can be a predetermined or arbitrary value stating a number of data object replicas 510 to be stored in various and separate storage resources 130. For example, in FIGS. 5 and 6, the replication factor equals three. It should be understood that the replication factor can be adapted based on the number of storage resources 130 or any existing policy requirements of the computer network infrastructure 100.

Figure 7:
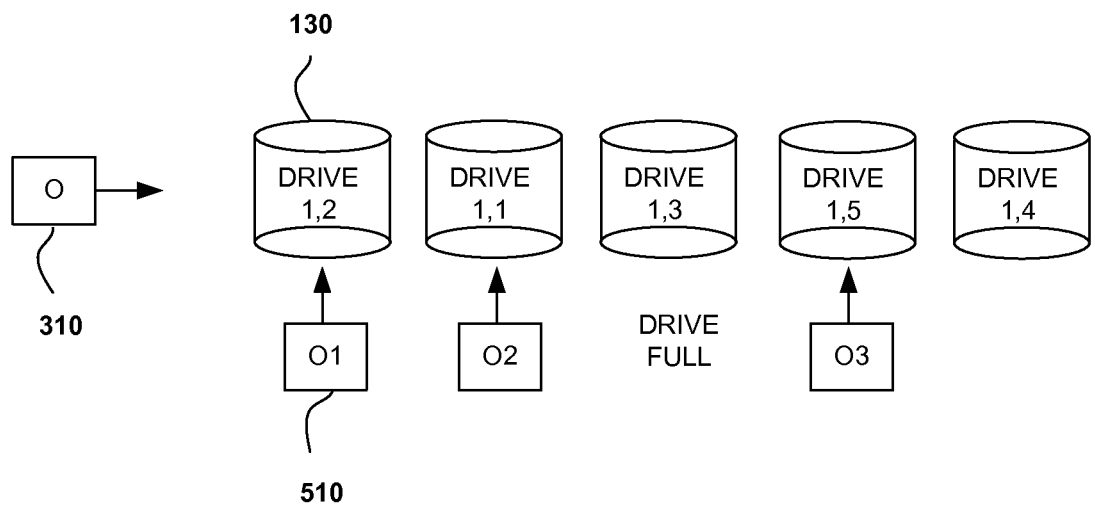
FIG. 7 shows an exemplary simplified process of skipping storage resource during the writing process to one node.

In general, based on the predetermined replication factor, a list of locations of data object replicas 510 can be generated. In addition, the storage resources 130 may generate "writing condition" statements that are processed during the writing algorithm. The writing condition statements may prevent data object replicas 510 from being stored in a particular storage resource 130 (because it may have limited free space, be out of order, not be currently used, and so forth). Accordingly, such a storage resource 130 may be skipped during the writing process. FIG. 7 shows an exemplary simplified way of skipping storage resource 130 during the writing process. More specifically, "drive 1,3" is full of data and, thus, it is skipped.

Figure 8:
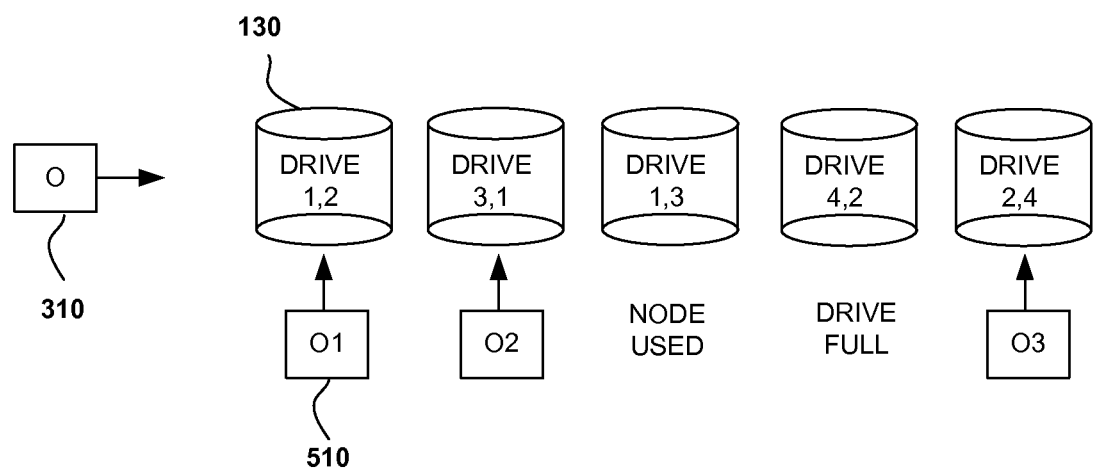
FIG. 8 shows an exemplary simplified process of skipping storage resource during the writing process to multiple nodes.

Furthermore, a particular node 120 can be skipped, if it already contains a data object replica 510 stored in any storage resource 130 the node includes. Accordingly, when a particular node 120 comprises a data object replica 510, the node 120 is skipped, which makes fault tolerance higher. This process is shown in FIG. 8, which illustrates that storage resource "1,3" is skipped since the storage resource "1,2" already has a data object replica 510. The storage resource "1,3" and "1,2" pertain to one and the same node.

The algorithm of skipping nodes 120 or resource storages 130 during the writing process when they already comprise data object replicas 510 can be represented by the following exemplary pseudocode:

```
procedure attemptwrite(vdisk, objid, state)
begin
    success = vdisk.node.put(state.obj)
    if (success) {
        state.num_replicas_written++
        if(state.num_replicas_written >= state.num_replicas_needed)
            return STOP
    }
    return CONTINUE
end
procedure write(vring, obj, nreplica)
begin
    objid = HASH(obj)
    state.obj = obj
    state.num_replicas_written = 0
    state.num_replicas_needed = nreplica
    ringwalk(vring, objid, nreplica, attemptwrite, state)
    if(state.num_replicas_written != state.num_replicas_needed)
        return ERROR
    return SUCCESS
end
```

Read Algorithm

As discussed, the write algorithm retries the save operations until the replication factor is satisfied. This means that upon success, a copy of the data object will end up on a physical storage resource in the node. Accordingly, the guaranteed approach for a reading algorithm is to scan all the physical identifiers and retrieve a copy of the data object. Consequently, the reading algorithm may check all nodes in the network infrastructure. Since each node is associated with the respective physical storage resources within the node, in most cases checking each physical storage resource within the network infrastructure is not required.

The reading algorithm used for access to the object can be expressed as the following example pseudocode:

```
procedure attemptread(vdisk, objid, state)
begin
    (state.found, state.obj) = vdisk.node.get(objid)
    if(state.found == true) {
        return STOP
    }
    return CONTINUE
end
procedure read(objid)
begin
    ringwalk(vring, objid, attemptread, state)
    if (state.found)
        return state.obj
    return nil
end
```

According to various embodiments, the reading algorithm may also use "hints" from previous operations for load balancing in the network infrastructure. For example, if a storage resource has failed, it indicates that data objects have been replicated elsewhere in the network infrastructure, and the search for an object on the failed storage resource can be skipped during the read. Thus, write failures, read failures, and rebalancing can be used as signals to re-compute the list of skipped storage resources. This particular process can be expressed by the following example pseudocode:

```
procedure attemptread(vdisk, objid, state)
begin
    if(vdisk.disk is in state.disk_skip_list)
        return CONTINUE
    (state.found, state.obj) = vdisk.node.get(objid)
    if(state.found == true) {
        return STOP
    }
    return CONTINUE
end
procedure read(objid)
begin
    state.disk_skip_list = <list of disks we want to skip>
    ringwalk(vring, objid, attemptread, state)
    if(state.found)
        return state.obj
```

-continued

```
    return nil
end
```

Rebalance Algorithm

The distribution balance of the consistent namespace 210 will change as soon as new storage resources are added or removed from the network infrastructure or when the available capacity of certain storage resources is changed. Whatever event causes these changes, the consistent namespace 210 will need to have the data objects and their corresponding identifiers rebalanced to meet the predetermined replication factor. It should be also understood that the consistent namespace 210 may change frequently in view of data migration, and each change may require performing a rebalancing algorithm for the data objects. Thus, the consistent namespace 210 may employ a rebalancing algorithm which enables re-distribution of data objects to different nodes after the consistent namespace 210 has been changed, for example, in view of addition or removal of at least one node 120 or at least one storage resource 130.

Figure 9:
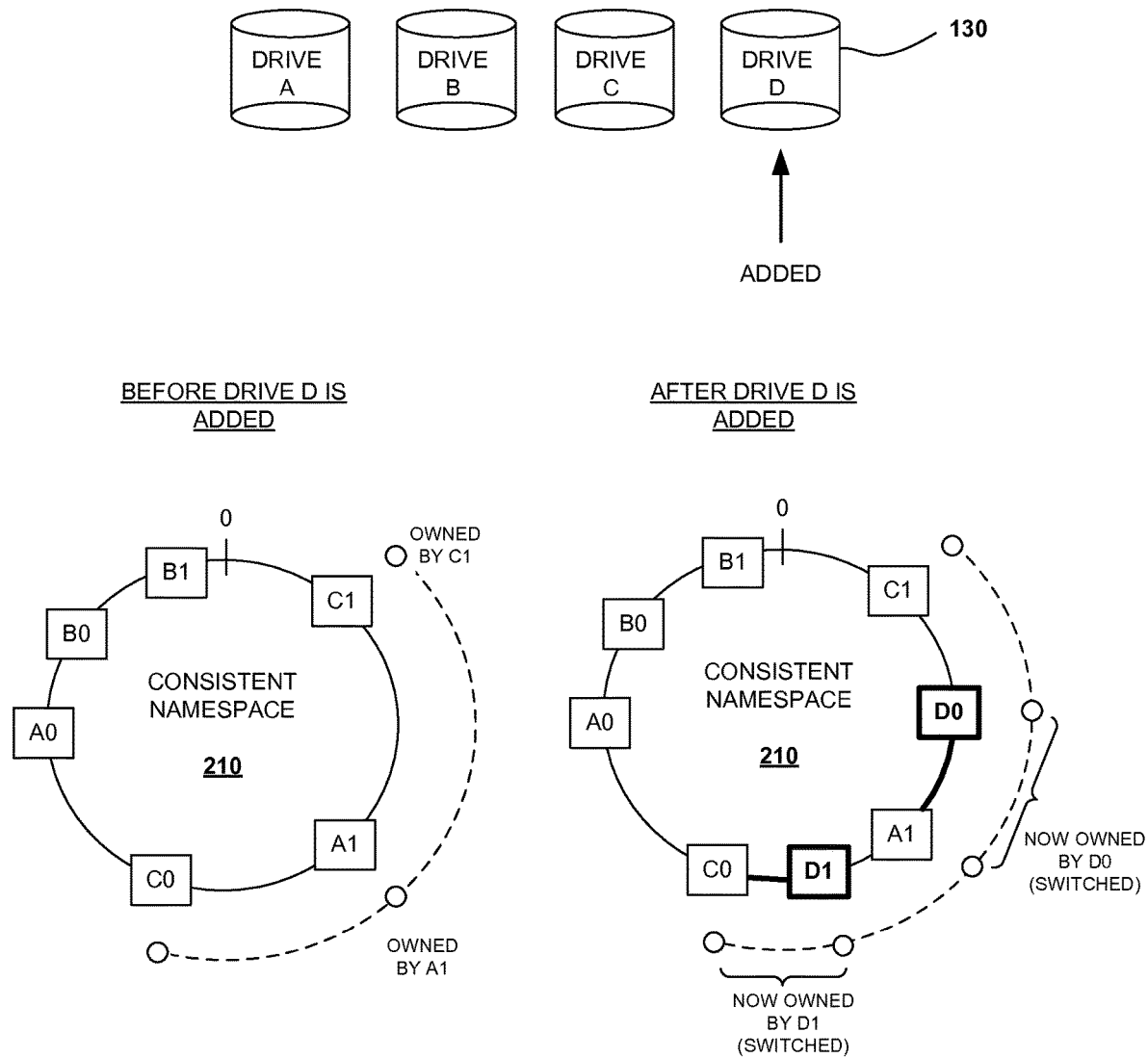
FIG. 9 shows an exemplary representation of the addition of a new storage resource, which causes an ownership change in the consistent ring namespace.

FIG. 9 shows an exemplary representation of the addition of a new storage resource 130, depicted as drive "D," which causes an ownership change in the consistent namespace 210 such that, consequently, data objects should migrate to those storage resources that own them. The virtual identifiers that are added to the consistent namespace will represent the ownership of drive "D".

The result of the ownership change is that any data objects on drive "A" or drive "C" that are now owned by virtual identifier "D" will be read from virtual identifier "D" as the new owner. Consequently, the node containing drive "D" will transfer the data from a replica location of the data object since they can be looked up using the same namespace traversal algorithm. This allows a lazy read of the data object by the new owner since the replication ring namespace is still intact.

Figure 10:
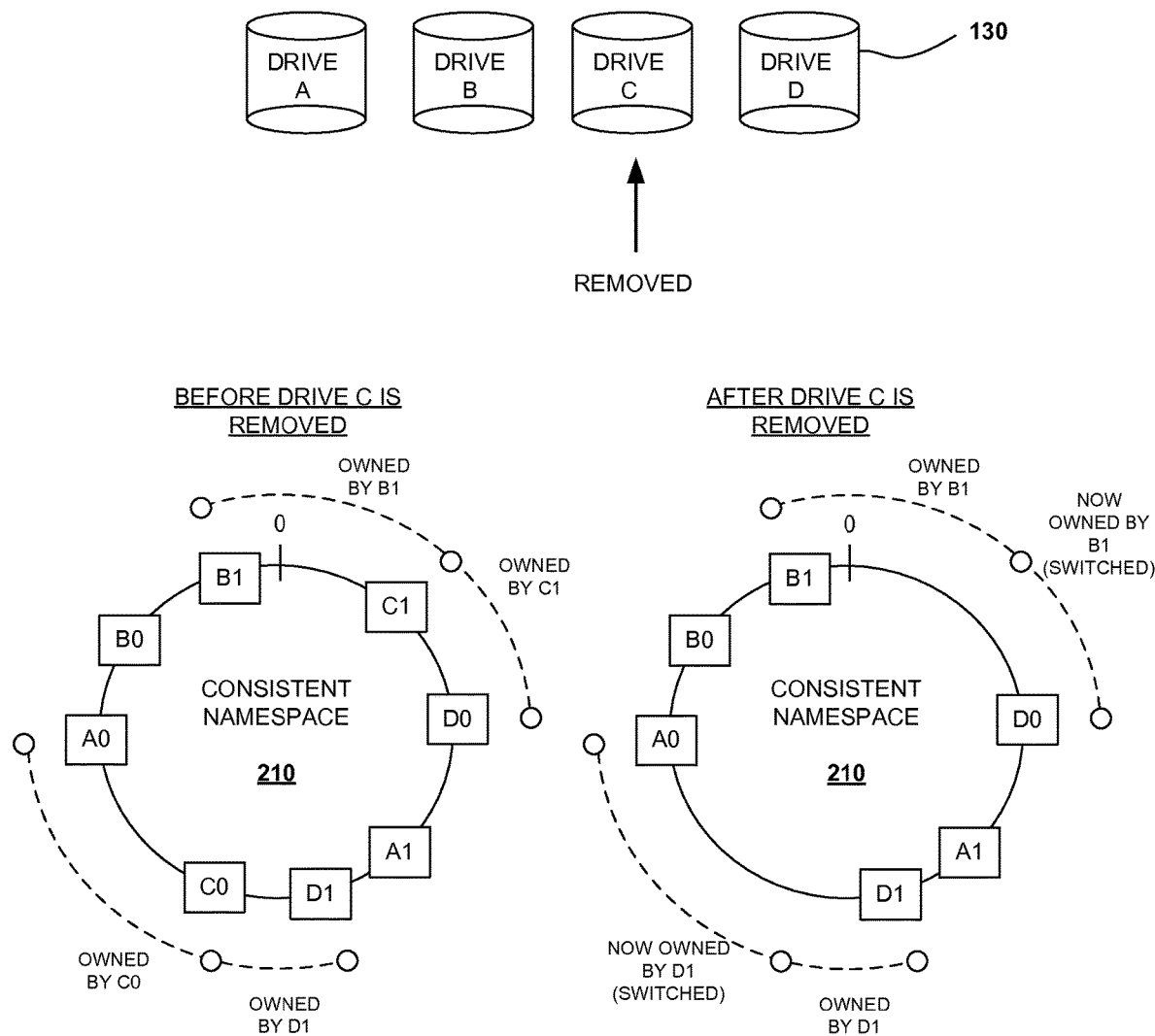
FIG. 10 shows an exemplary representation of the exclusion of a storage resource, which causes an ownership change in the consistent ring namespace.

The rebalance algorithm also involves addressing the problem of storage resource removal. When a storage resource is removed from the network, the consistent namespace requires rebalancing. FIG. 10 shows an exemplary representation of exclusion of a storage resource 130 depicted as drive "C," which causes an ownership change in the consistent namespace 210. As a result of the drive removal, data objects are migrated to maintain the predetermined replication factor. As shown in the figure, the ownership of the data object is transitioned in a counter clockwise manner.

Since a change of ownership can occur for both addition and removal states, it is possible to establish a scheduling algorithm from a node 120 to service the rebalancing of the consistent namespace 210 during such state changes. This algorithm may be fundamental to a quicker convergence of the consistent namespace 210 during an ownership change rather than relying on a simple read semantic to transfer objects over time.

The ownership in the consistent namespace 210 can be adjusted by the presence of the new virtual identifiers. Accordingly, considering the virtual identifier of "D0" by itself after drive "D" is added (see FIG. 9) shows the changes to the replicas in the consistent namespace 210. This allows a query to be formed to the previous owners of the consistent namespace 210 to find any objects that were previously in the ranges that "D0" now owns. A simplified query can be constructed as the following:

Replica 1—Ask Node with C1 for any object ∈ {D0, A1-1}
Replica 2—Ask Node with C1 for any object ∈ {C1, D0-1}
Replica 3—Ask Node with B1 for any object ∈ {B1, C1-1}
Replica 4—Ask Node with B0 for any object ∈ {B0, B1-1}
Replica 5—Ask Node with A0 for any object ∈ {A0, B0-1}
Replica 6—Ask Node with C0 for any object ∈ {C0, A0-1}
Replica 7—Ask Node with A1 for any object ∈ {A1, C0-1}

This assumes that every primary owner will have all of the data objects in the range set to be returned, which is not the case when a storage resource 130 is full and the write algorithm proceeds to the next available storage resource 130 to store the data object and satisfy the replication factor. To account for this behavior, the algorithm needs to query every node 120 in the cluster; this can be done as shown below.

Replica 1—For each Node ask for any object ∈ {D0, A1-1}
Replica 2—For each Node ask for any object ∈ {C1, D0-1}
Replica 3—For each Node ask for any object ∈ {B1, C1-1}
Replica 4—For each Node ask for any object ∈ {B0, B1-1}
Replica 5—For each Node ask for any object ∈ {A0, B0-1}
Replica 6—For each Node ask for any object ∈ {C0, A0-1}
Replica 7—For each Node ask for any object ∈ {A1, C0-1}

This algorithm can perform a "ringwalk" of the consistent namespace 210 and query every node for all the object replicas, or iterate over the expected data object replicas and walk the ring multiple times based on the characteristics of the network infrastructure and the desired load performance of the rebalance algorithm. It should also be noted that these queries may run concurrently with the normal read operations and provide a rebalance to the consistent ring namespace.

An example pseudocode algorithm for a change of ownership can be expressed, for example, as:

```
procedure query(vdisk, idrange)
begin
    objectids = { }
    index = vdisk.node.index( )
    for(o = index.first; o != indexlast; o = o.next) {
        if(o.id is in idrange)
            objectids.append(o.id)
    }
    return objectids
end
procedure rebalance(vring, vdisk, nreplica)
begin
    replicas = ringwalk(vdisk, vring, nreplica, noop, nil)
    for(n = 0; n < replicaslength; n++) {
        idrange = { replicas[n], replicas[n+1] }
        objectids = query(replicas[n], idrange)
        for(i = 0; i < objectids.length; i++) {
            if(vdisk.node.hasid(objectids[i]) == true)
                continue
            obj = read(objectsid[i])
            vdisk.node.put(obj)
```

```
      }
    }
  end
```

Those skilled in the art would appreciate that the rebalance algorithm may introduce a load on the network infrastructure by querying the stored index of data objects of the nodes and then the actual movement of data. This operation is shown to be different in the scenarios above so that the work can be split across the consistent namespace 210 instead of hitting one node. However, to avoid an immediate burst of traffic on the system, an exponential backoff algorithm should be used during the rebalance to avoid immediate data movement.

In some embodiments, the exponential backoff delay calculation can be used to offset the start of the rebalancing algorithm. The computation of the delay can be done on each node individually to avoid any shared state consensus for the network using the following equation:

$$\text{delay} = \frac{mintime = m * 2^{retrycnt}}{rand(1.0, 2.0)}$$

An example pseudocode algorithm for delay calculation can be expressed as:

```
procedure addnode(vring, vdisk, retrycnt)
begin
  minimum = 1
  maximum = 600
  mfactor = 3
  maxretry = 7   /* log_2((maximum - minimum) / mfactor) */
  if(retrycnt < maxretry) then
    delay = minimum
    delay += mfactor << retrycnt
  else
    delay = maximum
    delay *= 0.5 + 0.5 * (random( ) / RAND_MAX)
  wait(delay)
  rebalance(vring, vdisk)
end
```

Figure 11:
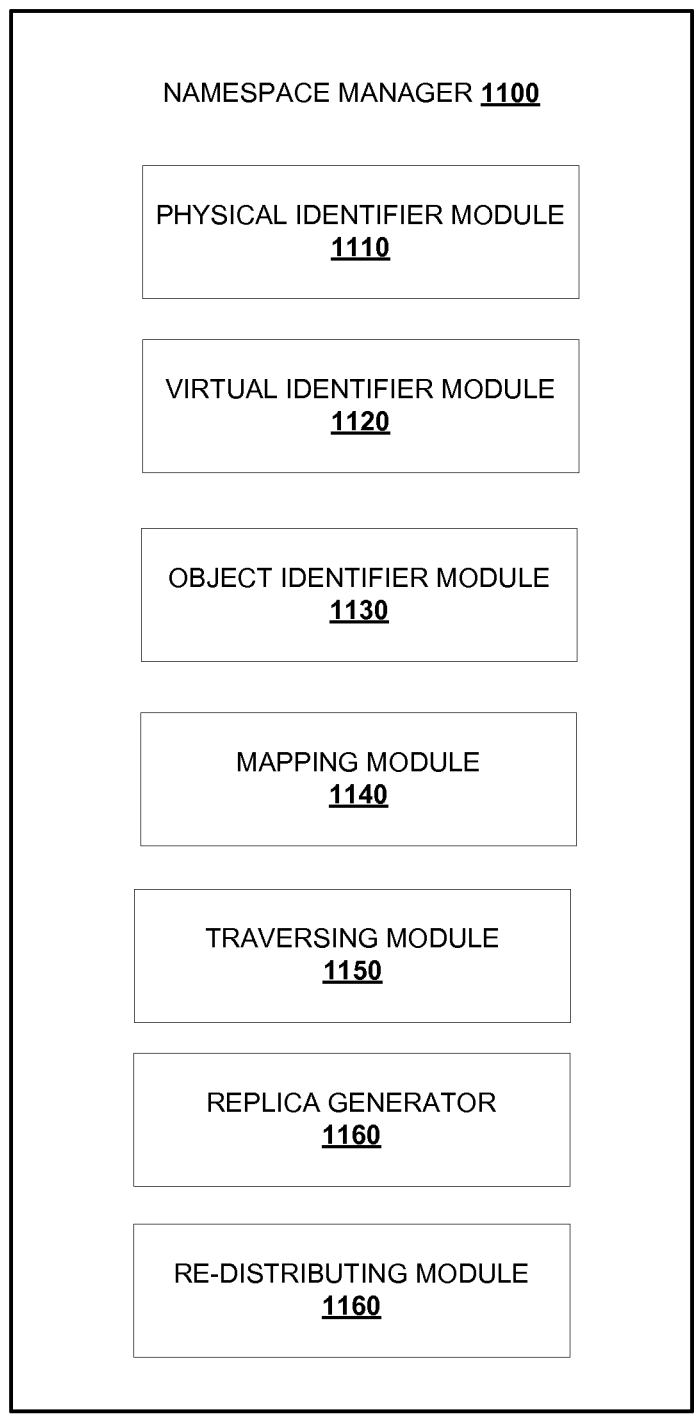
FIG. 11 shows a namespace manager.

FIG. 11 shows a namespace manager 1100, according to an exemplary embodiment. The namespace manager 1100 is suitable for employment of computer-implemented methods for managing data objects within a computer network infrastructure 100 having a plurality of nodes. As shown in the figure, the namespace manager 1100 comprises a physical identifier module 1110, a virtual identifier module 1120, an object identifier module 1130, a mapping module 1140, a traversing module 1150, a replica generator 1160, and re-distributing module 1170.

The physical identifier module 1110 can be configured to establish physical identifiers for storage resources of any node 120 of the network 110. Such physical identifiers were described above and, in general, they represent hash values of a cryptographic hashing function over the storage resource universally unique identifiers.

The virtual identifier module 1120 can be configured to generate, based on the physical identifier, a plurality of unique virtual identifiers for each storage resource 130 of the nodes 120. As described above, the plurality of unique virtual identifiers can be stored in a consistent ring namespace, which can be accessible for every node. The plurality of unique virtual identifiers can be generated based on principles of hash chaining and be based on the physical identifiers as calculated by the physical identifier module 1110 and the hash length. Furthermore, the plurality of unique virtual identifiers can be generated in such a way that they are randomly and evenly distributed over the consistent ring namespace.

The object identifier module 1130 can be configured to generate object identifiers for data objects to be stored in a storage resource 130 of any node 120. The object identifier may be a hash function computed over the object data. Object identifiers may be generated for every data object (e.g., a file system object such as a file or a plurality of files) or its part when it is stored in any of nodes 120

The mapping module 1140 can be configured to map the object identifier as generated by the object identifier module 1130 to the consistent ring namespace. The mapping procedure may correspond to the principles of writing, reading, rebalancing, and other algorithms as described herein.

The traversing module 1150 may be configured to enable computing devices associated with nodes 120 of the network 110 to traverse the consistent namespace 210 from any node 120 to locate and access a certain data object. Enabling traversing of the consistent namespace 210 may involve navigating or enabling navigating through a consistent namespace 210 to a certain physical namespace storing object identifiers in order to determine the location of the data object and, optionally, access it. In addition, the traversing module 1150 can help nodes to conduct actions to look up, write, read, replace, and erase.

The replica generator 1160 may be configured to generate a plurality of data object replicas and store them in different storage resources 130 of the same node 120 or several nodes 120, depending on current application and requirements. The data object replicas can be stored in the consistent namespace 210 accessible for every node 120. The number of data object replicas and the policy of their generation and storing can be predetermined. For example, the number of data object replicas may correspond to a predetermined replication factor, which may define a number of different nodes 120 and/or a number of different storage resources 130.

The re-distributing module 1170 can be configured to re-distribute the unique virtual identifiers 220 within the consistent namespace 210 when a node 120 is added or removed from the network 110, or when the available capacity of a storage resource 130 is changed within a certain node 120. As discussed, the purpose of virtual identifier distribution is to obtain a more or less consistent distribution of identifiers within the consistent namespace 210 to facilitate a higher speed of data object addressing.

Figure 12:
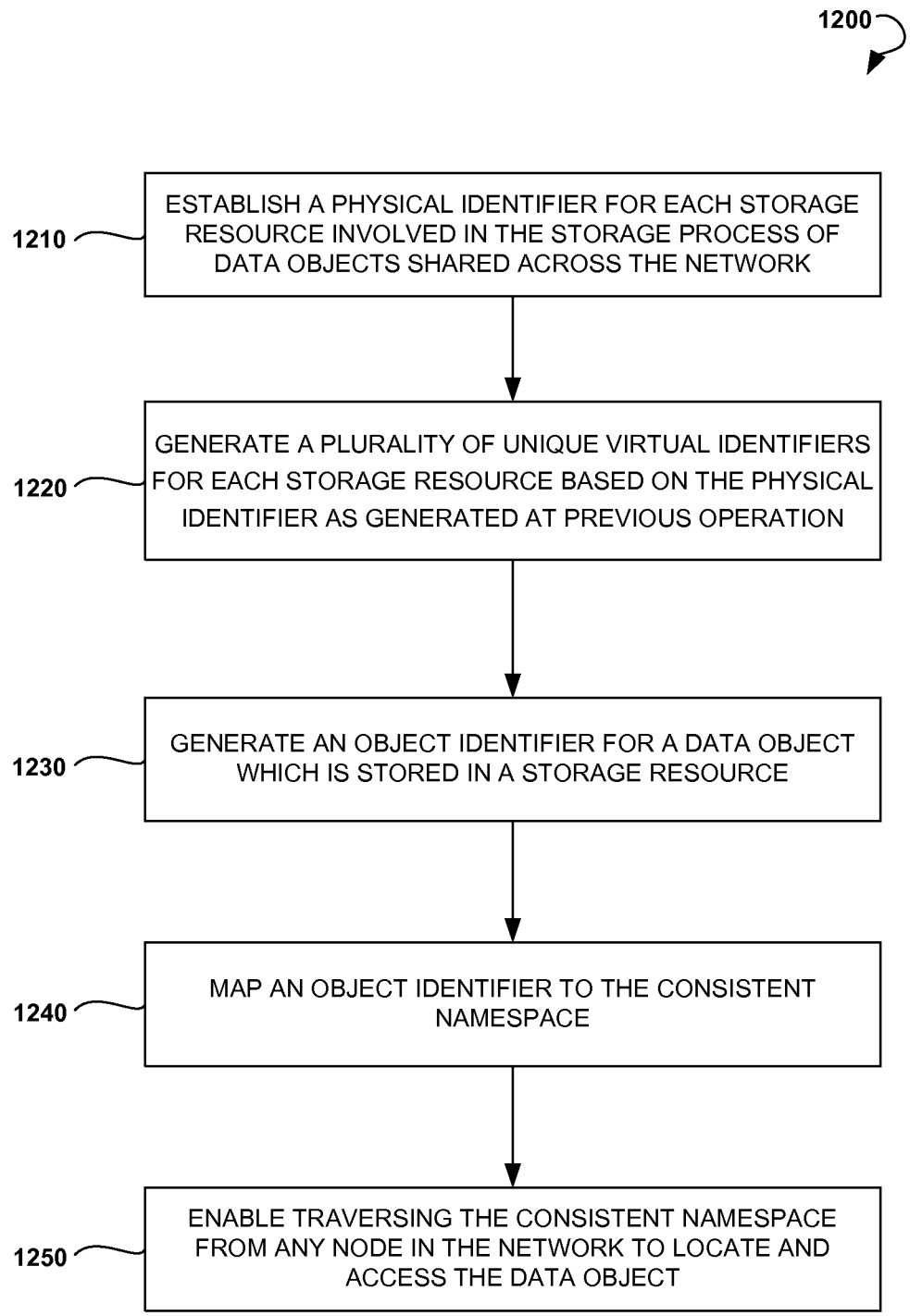
FIG. 12 is a process flow diagram showing a method for managing data objects within a computer network infrastructure.

FIG. 12 is a process flow diagram showing a method 1200 for managing data objects within a computer network infrastructure 100. The method 1200 may be performed by logic that may comprise hardware (e.g., dedicated logic, programmable logic, and microcode), software (such as software run on a general-purpose computer system or a dedicated machine), or a combination of both. In one exemplary embodiment, the processing logic resides at the namespace manager 1100, and the various modules of the namespace manager 1100 can perform the method 1200. It will be appreciated by one of ordinary skill that examples of the foregoing modules may be virtual, and instructions said to be executed by a module may, in fact, be retrieved and executed by the namespace manager 1100. Although various modules may be configured to perform some or all of the various steps described herein, fewer or more modules may be provided and still fall within the scope of various embodiments.

As shown in FIG. 12, the method 1200 may commence at operation 1210 with the physical identifier module 1110 establishing a physical identifier for each storage resource 130 involved in the storage process of data objects shared across the network 110.

At operation 1220, the virtual identifier module 1120 generates a plurality of unique virtual identifiers 220 for each storage resource 130 based on the physical identifier as generated at the previous operation. In general, the plurality of such virtual identifiers is generated in light of applying a consistent hashing procedure to the physical identifier as generated at operation 1210. The generated virtual identifiers 220 can be stored in a consistent namespace 210 accessible to every node 120.

At operation 1230, the object identifier module 1130 generates one or more object identifiers for one or more data objects that are stored in the storage resource 130. Such object identifiers can be associated with the storage resource location of the data object.

At operation 1240, the mapping module 1140 conducts mapping of the object identifier to the consistent namespace 210. The mapped object identifier determines the input to the ring walk algorithm across the nodes 120 of the network 110 to locate and access this data object.

At the following operation 1250, the traversing module 1150 enables traversing the consistent namespace 210 from any node 120 in the network 110 to locate and access a data object. This operation facilitates traversing the consistent namespace 210 and may further involve navigating, or enabling navigation, through a consistent namespace 210 to a certain physical namespace 200 storing object identifiers in order to locate the particular data object.

Figure 13:
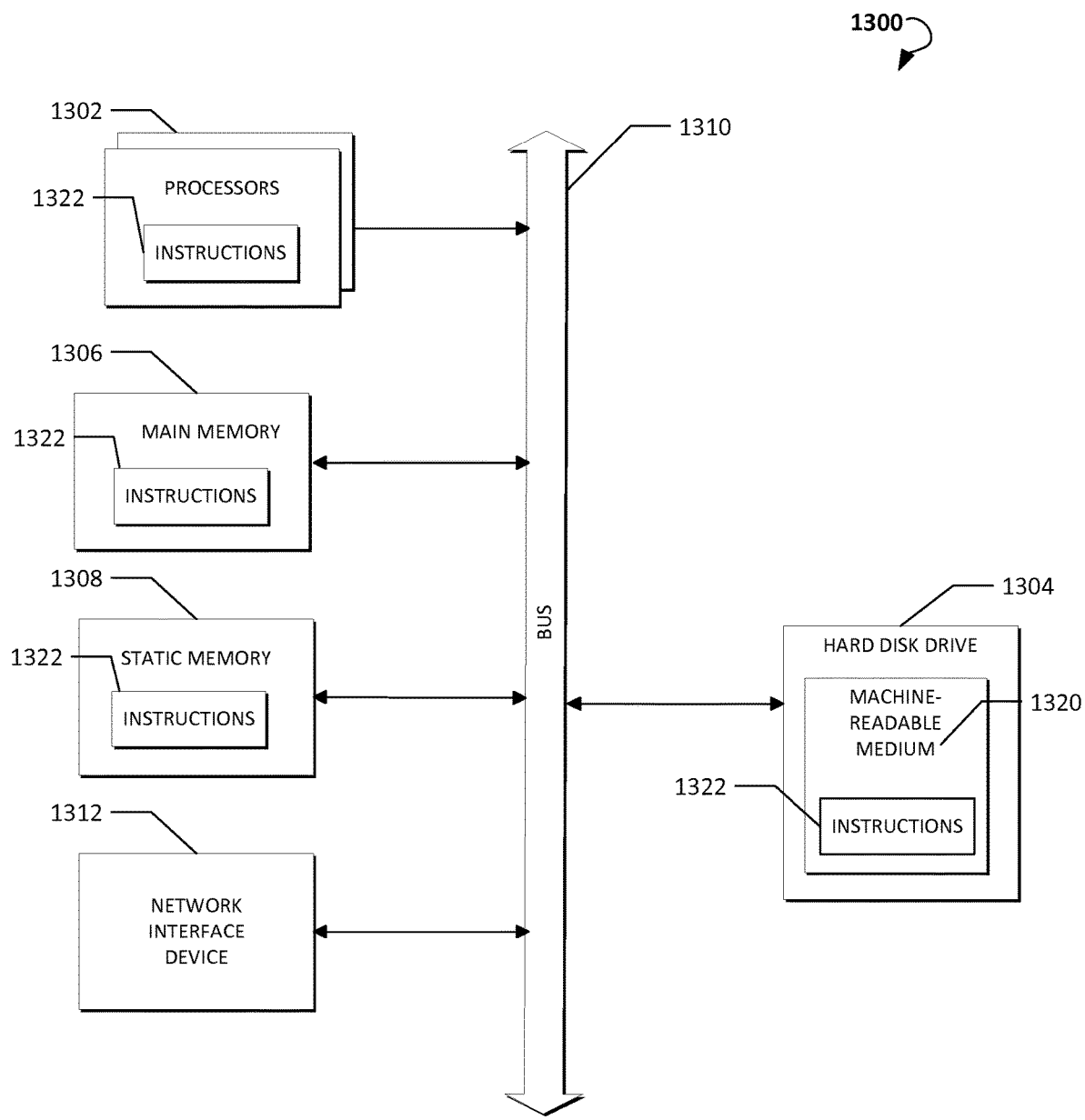
FIG. 13 shows a diagrammatic representation of a computing device for a machine in the exemplary electronic form of a computer system, within which a set of instructions for causing the machine to perform any one or more of the methodologies discussed herein, can be executed.

FIG. 13 shows a diagrammatic representation of a computing device for a machine in the exemplary electronic form of a computer system 1300, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a PDA, a cellular telephone, a digital camera, a portable music player (e.g., a portable hard drive audio device, such as a Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor or multiple processors 1302, a hard disk drive 1304, a main memory 1306 and a static memory 1308, which communicate with each other via a bus 1310. The computer system 1300 may also include a network interface device 1312. The hard disk drive 1304 may include a machine-readable medium 1320, which stores one or more sets of instructions 1322 embodying or utilized by any one or more of the methodologies or functions described herein. The instructions 1322 can also reside, completely or at least partially, within the main memory 1306 and/or within the processors 1302 during execution thereof by the computer system 1300. The main memory 1306 and the processors 1302 also constitute machine-readable media.

While the machine-readable medium 1320 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "machine-readable medium" shall accordingly be taken to include, but not be limited to, solid-state memories, optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, Go, Python or other compilers, assemblers, interpreters or other computer languages or platforms.

Thus, computer-implemented methods and systems for managing data in a data storage medium are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A method for managing data objects within a computer network infrastructure, the method comprising:
    identifying a computer network infrastructure comprising a plurality of nodes, each node comprising one or more tangible storage resources;
    establishing a unique physical identifier for each of the tangible storage resources;
    generating multiple unique virtual identifiers for each of the tangible storage resources;
    storing the multiple unique virtual identifiers in a consistent ring namespace accessible for every one of the nodes;
    generating an object identifier associated with a location of a data object stored in one of the tangible storage resources;
    mapping the object identifier to the consistent ring namespace in a position in the consistent ring namespace between, in a ring-walk order, the unique virtual identifier of the one of the tangible storage resources and another unique virtual identifier of the multiple unique virtual identifiers stored in the consistent ring namespace; and enabling traversing of the consistent ring namespace from any of the nodes in the computer network infrastructure in order to locate and access the data object.

2. The method of claim 1, wherein the unique physical identifier is a hash value generated from:

a universally unique storage resource identifier; or a combination of the storage resource manufacturing model and a serial number.

3. The method of claim 1, wherein:

the unique virtual identifiers are generated to achieve a specific distribution either manually or programmatically; and the generating of the multiple unique virtual identifiers comprises applying hash chaining to the physical identifier associated with the tangible storage resource to generate an arbitrary number of unique virtual identifiers associated with an individual tangible storage resource.

4. The method of claim 1, wherein the generating of the multiple unique virtual identifiers is performed in such a way that an arbitrary number of unique virtual identifiers is mapped over the consistent ring namespace.

5. The method of claim 1, wherein the number of generated unique virtual identifiers is the same or greater than the number of the tangible storage resources in the computer network infrastructure.

6. The method of claim 1, wherein the object identifier is a hash value generated from the data object.

7. The method of claim 1, wherein the tangible storage resource of a data object replica is written based upon the location of the mapped virtual identifiers in the consistent ring namespace.

8. The method of claim 7, further comprising generating multiple data object replicas and storing them in different ones of the tangible storage resources by walking the ring namespace to find different virtual identifiers.

9. The method of claim 8, wherein the tangible storage resources are selected based upon a preference to use different nodes in the computer network infrastructure for the data object replicas.

10. The method of claim 8, wherein the tangible storage resources are selected based upon a preference to use different tangible storage resources in the same node for the data object replicas.

11. The method of claim 8, wherein the tangible storage resources are skipped in the order of the ring walk when a data object replica cannot successfully be stored.

12. The method of claim 7, further comprising generating a plurality of data object replicas and storing them in different tangible storage resources.

13. The method of claim 12, wherein a number of data object replicas corresponds to a replication factor based on the number of tangible storage resources or policy requirements of the computer network infrastructure.

14. The method of claim 1, wherein the enabling of traversing of the consistent ring namespace comprises navigating, through the consistent ring namespace, to storage resource identifiers in order to determine a tangible storage resource to retrieve the data object.

15. The method of claim 1, further comprising re-mapping unique virtual identifiers within the consistent ring namespace when a tangible storage resource is added to the computer network infrastructure.

16. The method of claim 1, further comprising re-mapping unique virtual identifiers within the consistent ring namespace when available capacity of any of the tangible storage resources is changed.

17. The method of claim 1, further comprising re-distributing data objects to different ones of the tangible storage resources after the consistent ring namespace has been changed in view of addition or removal of at least one node or at least one tangible storage resource.

18. The method of claim 17, wherein when one of the tangible storage resources is removed from the computer network infrastructure, the data objects are copied in ring walk order to subsequent tangible storage resources still available in the computer network infrastructure.

19. The method of claim 17, wherein re-distribution of data objects can exceed a replication factor to use spare capacity of tangible storage resources in the computer network infrastructure for performance and reconstruction improvements.

20. A non-transitory processor-readable medium having instructions stored thereon, which when executed by one or more processors, causes the one or more processors to perform the method of claim 1.

* * * * *